May 30, 1950     D. H. LOOSLI     2,509,688
CHUCK
Filed Jan. 31, 1949
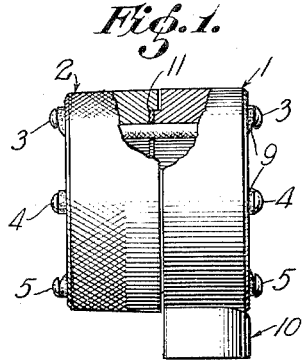
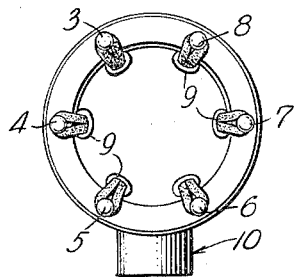
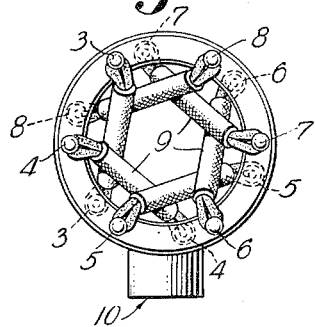
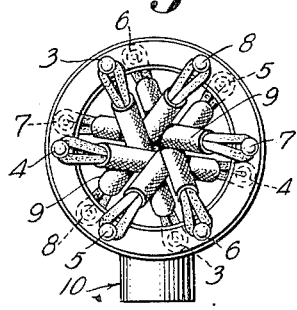
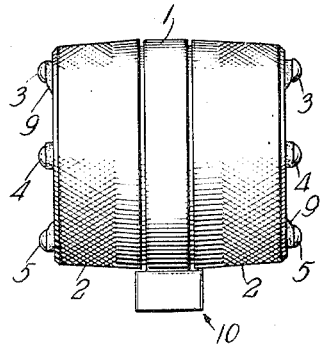
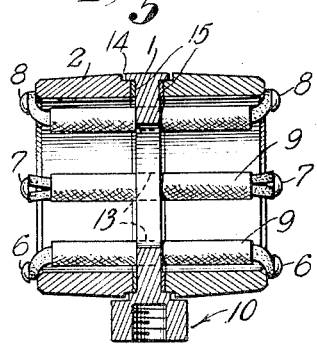
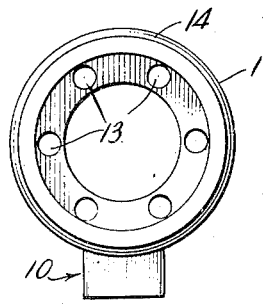
Inventor:
Dimond Herschl Loosli Patented May 30, 1950

2,509,688

UNITED STATES PATENT OFFICE 2,509,688

CHUCK

Dimond Herschel Loosli, Idaho Falls, Idaho, assignor to D. H. Loosli Company, Inc., Idaho Falls, Idaho, a corporation of Idaho Application January 31, 1949, Serial No. 73,729

2 Claims. (Cl. 279—1)

My invention relates to construction of chucks and the like, particularly to chucks which feature very sensitive adjustment, lightness in weight, simplicity of construction, instantaneous adjustment, and an important object of my invention is to provide a simple and practical arrangement of the character indicated. Other important objects and advantages of my invention will be apparent from a reading of the following description taken in connection with the drawings, wherein for purposes of illustration I have set forth the preferred embodiment of my invention.

In the drawings:

Figure 1 is a side view of the chuck.

Figure 2 is an end view of Figure 1 showing the chuck fully open.

Figure 3 is an end view of the chuck showing the chuck fully closed.

Figure 4 is an end view of the chuck showing the chuck completely closed.

Figure 5 is a side view of a chuck with double adjustment.

Figure 6 is a sectional view of Figure 5.

Figure 7 is an end view of section 1, Figure 5, showing holes through which elastic members pass.

The chuck as shown in Figures 1, 2, 3 and 4 is made up in two sections 1 and 2. Section 1 has a downward facing hub 10 which is drilled and tapped for attachment of a shaft for holding the chuck while in use. As may be noted in Figures 1, 2, 3 and 4 there are projections 3, 4, 5, 6, 7, 8 extending outwardly from the vertical rim of the chuck face of section 1 as well as from the vertical rim of the rotatable section 2. Elastic members 9, Figures 1, 2, 3, 4, such as elastic bands, springs, etc., attach to and stretch from projections 3, 4, 5, 6, 7, 8 on the chuck face section 1 through the chuck opening to the corresponding projections 3, 4, 5, 6, 7, 8 on the face of rotatable section 2. It will be noted that elastic members 9 are shorter than the distance between the opposite faces of the chuck thus pressure is exerted at a point between the inward facing edges of sections 1 and 2 which sections are separated by a friction washer 11. This friction washer causes the rotatable section 2 to remain in any desired position of adjustment.

A flange on the inward facing edge of section 1 and a corresponding receptacle on the inward facing edge of section 2, as in Figure 7 are provided to keep the two sections in alignment and for retaining friction washer 11 in position.

In the presented application elastic members 9 are covered with flexible tubing 12, Figure 3, to protect them from abrasion.

For purposes of clearer explanation of how the clutch operates referring to Figure 3, the rotatable section 2 has been turned 120 degrees clockwise which brings the elastic members 9 nearer the true axis of the chuck thus somewhat restricting the opening through the opening of the chuck. In Figure 4 the rotatable section 2 has been turned 180 degrees clockwise from the open position as in Figure 2 which places projection 3, section 2, to correspond in horizontal alignment with 6, section 1, and likewise all other projections 4, 5, 6, 7, 8 on section 2 180 degrees away from their original positions, Figure 2, which causes elastic members 9 to intersect at the true axis of the chuck completely closing the opening through the horizontal opening of the chuck. It is obvious then that if rods, tubes, cord etc. are run through the horizontal opening of the chuck and the rotatable section 2 turned to a closed position as in Figure 4 a clamping action will result gripping at any desired degree of tension the object being held.

Figures 5 and 6 show a chuck with double adjustment and likewise double gripping action but employing the same principle as in Figures 1, 2, 3, 4. As may be seen the center section 1 is stationary while 2 and 2 are rotatable. Figure 6 is a side view of Figure 5 in section showing the approximate position of elastic members 9 when both rotatable sections 2 and 2 are turned to a closed position as in Figure 4. In this construction the stationary section 1, Figure 7, has holes 13 drilled through the inwardly projecting flange, Figure 7, corresponding in number with the number of projections on section 2 and 2 through which elastic members 9 are run as they span between projections 3, 3, 4, 4, etc., thus elastic members 9 intersect at two points along the horizontal axis of the chuck instead of at the true axis of the chuck as in Figure 4.

While I have shown and described but two forms of construction employing the same principle, I comprehend within my invention all such variations and modifications that will come within the scope of my claims hereto annexed, without departing from the true principle of my invention.

Having described my invention what I claim as new is:

1. A chuck comprising cylindrical sections, said sections being disposed with their respective faces adjacent one another in line with a horizontal axis, means for keeping said sections in alignment forming substantially a continuous cylinder with some of said sections being rotatable at right angles to the horizontal axis of said cylinder, means securing the ends of elastic members to depend from ends of said cylinder, said elastic members extending through the opening of said cylinder holding sections of said cylinder tensionably together, and means supporting said cylinder while in use substantially as described.

2. A chuck comprising a cylindrical section, said section having a hub disposed substantially at right angles to the horizontal axis of said cylinder, said hub to depend from said cylinder, said hub provided for attachment of suitable means for holding said chuck while in use, means on the face of said section for securing the ends of elastic members and on the opposite face of said cylindrical section a flange, a second rotatable cylindrical section being disposed in line with the horizontal axis of aforesaid section, having on the outward face thereof means for securing the ends of elastic members and on the inward face a female receptacle, a friction washer mounted over the male flange of the first mentioned section and between the inward facing edges of the multiple sections and elastic members secured to depend from outward facing ends of said multiple sections, said elastic members extending through the opening of said multiple sections holding said multiple sections tensionably together, substantially as described.

DIMOND HERSCHEL LOOSLI.

No references cited.